United States Patent
Baranczyk et al.

(10) Patent No.: US 10,152,509 B2
(45) Date of Patent: Dec. 11, 2018

(54) QUERY HINT LEARNING IN A DATABASE MANAGEMENT SYSTEM

(71) Applicant: International Business Machines Corporation, Armonk, NY (US)

(72) Inventors: Shawn J. Baranczyk, Rochester, MN (US); Rafal P. Konik, Oronoco, MN (US); Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 14/863,425

(22) Filed: Sep. 23, 2015

(65) Prior Publication Data

US 2017/0083575 A1    Mar. 23, 2017

(51) Int. Cl.
  G06F 17/30    (2006.01)
  G06F 17/27    (2006.01)
  G06N 99/00    (2010.01)

(52) U.S. Cl.
  CPC ...... G06F 17/30466 (2013.01); G06F 17/277 (2013.01); G06F 17/3097 (2013.01); G06F 17/30327 (2013.01); G06F 17/30336 (2013.01); G06F 17/30457 (2013.01); G06N 99/005 (2013.01)

(58) Field of Classification Search
  CPC .................. G06F 17/30457; G06F 17/3097
  See application file for complete search history.

(56) References Cited

U.S. PATENT DOCUMENTS

| | | | |
|---|---|---|---|
| 7,805,411 B2 | 9/2010 | Ziauddin et al. | |
| 8,170,975 B1 | 5/2012 | Qureshi et al. | |
| 8,190,595 B2 | 5/2012 | Bruno et al. | |
| 9,336,272 B1* | 5/2016 | Thombre | G06F 17/30442 |
| 2004/0019587 A1* | 1/2004 | Fuh | G06F 17/30471 |
| 2005/0097091 A1 | 5/2005 | Ramacher et al. | |
| 2005/0289100 A1* | 12/2005 | Dettinger | G06F 17/30395 |
| 2008/0313134 A1* | 12/2008 | Lei | G06F 17/30442 |
| 2010/0306188 A1* | 12/2010 | Cunningham | G06F 17/30463 707/713 |
| 2011/0055201 A1* | 3/2011 | Burger | G06F 17/30424 707/719 |

(Continued)

OTHER PUBLICATIONS

Bhangdiya, A. et al.; "The XDa-TA system for automated grading of SQL query assignments"; AN-15165434; International Conference on Data Engineering 2015.

(Continued)

*Primary Examiner* — Mark D Featherstone
*Assistant Examiner* — Ranjit P Doraiswamy
(74) *Attorney, Agent, or Firm* — Daniel R. Simek

(57) ABSTRACT

Disclosed aspects relate to query hint learning in a database management system. A hint in a first query is detected by the database management system. The first query has a first signature. A second query is received by the database management system. The second query has a second signature. A determination is made by the database management system that the second signature correlates with the first signature. A query plan is established by the database management system. The query plan is based on the second query and uses the hint in the first query. In response to receiving the second query, the database management system processes the query plan.

15 Claims, 4 Drawing Sheets

(56) References Cited

U.S. PATENT DOCUMENTS

2011/0295833 A1* 12/2011 Narasayya .......... G06F 11/3664
                                                          707/713
2011/0314000 A1* 12/2011 Chaudhuri ........ G06F 17/30463
                                                          707/718

OTHER PUBLICATIONS

Venkataramanan, T.S. et al.; "Method for staging area for performance benchmarks for sanity check"; An IP.com Prior Art Database Technical Disclosure; Oct. 5, 2010.
Ouyang, H. et al.; "Method and System for Learning Online Trends for Interactive Query Auto-Completion"; An IP.com Prior Art Database Technical Disclosure; Feb. 18, 2015.
Hsu, Chun-Nan et al.; "Rule Induction for Semantic Query Optimization"; Machine Learning, Proceedings of the 11th International Conference (ML94); < https://www.aaai.org/Papers/Workshops/1994/WS-94-03/WS94-03-027.pdf>; 1994.
Chan, Immanuel et al.; Oracle Database Performance Tuning Guide 10g Release 2 (10.2); <https://docs.oracle.com/cd/B19306_01/server.102/b14211.pdf; Mar. 2008.
IBM; "System and method to generate optimized SQL access plan based on existing plans"; An IP.com Prior Art Database Technical Disclosure; Feb. 1, 2010.
Disclosed Anonymously; "Hint Set for Access Path Select"; An IP.com Prior Art Database Technical Disclosure; Aug. 11, 2014.
Baranczyk et al., "Query Hint Learning in a Database Management System", U.S. Appl. No. 15/075,177, filed Mar. 20, 2016.
List of IBM Patents or Patent Applications Treated As Related.

* cited by examiner

QUERY HINT LEARNING IN A DATABASE MANAGEMENT SYSTEM

BACKGROUND

This disclosure relates generally to database management systems and, more particularly, relates to query hints. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to query hint learning in a database management system. Hints are supported by many databases including those which are key-value store or document-based. Database users/administrators can tailor queries in ways the user/administrator desires by inputting hints into their production environments (e.g., controlled by the user/administrator). Query hint learning, as described herein, may allow a database management system to use what a user/administrator input on an original query to influence operation of the database management system with respect to a later query. As such, query hint learning may provide the optimizer more information to make more efficient query plans for other/future queries based on information provided by the query hints. Accordingly, the input of the administrator/user may be leveraged in other/future queries dynamically (e.g., algorithmically/automatically without another/added input/involvement from the user/administrator).

Disclosed aspects relate to query hint learning in a database management system. A hint in a first query is detected by the database management system. The first query has a first signature. A second query is received by the database management system. The second query has a second signature. A determination is made by the database management system that the second signature correlates with the first signature. A query plan is established by the database management system. The query plan is based on the second query and uses the hint in the first query. In response to receiving the second query, the database management system processes the query plan.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
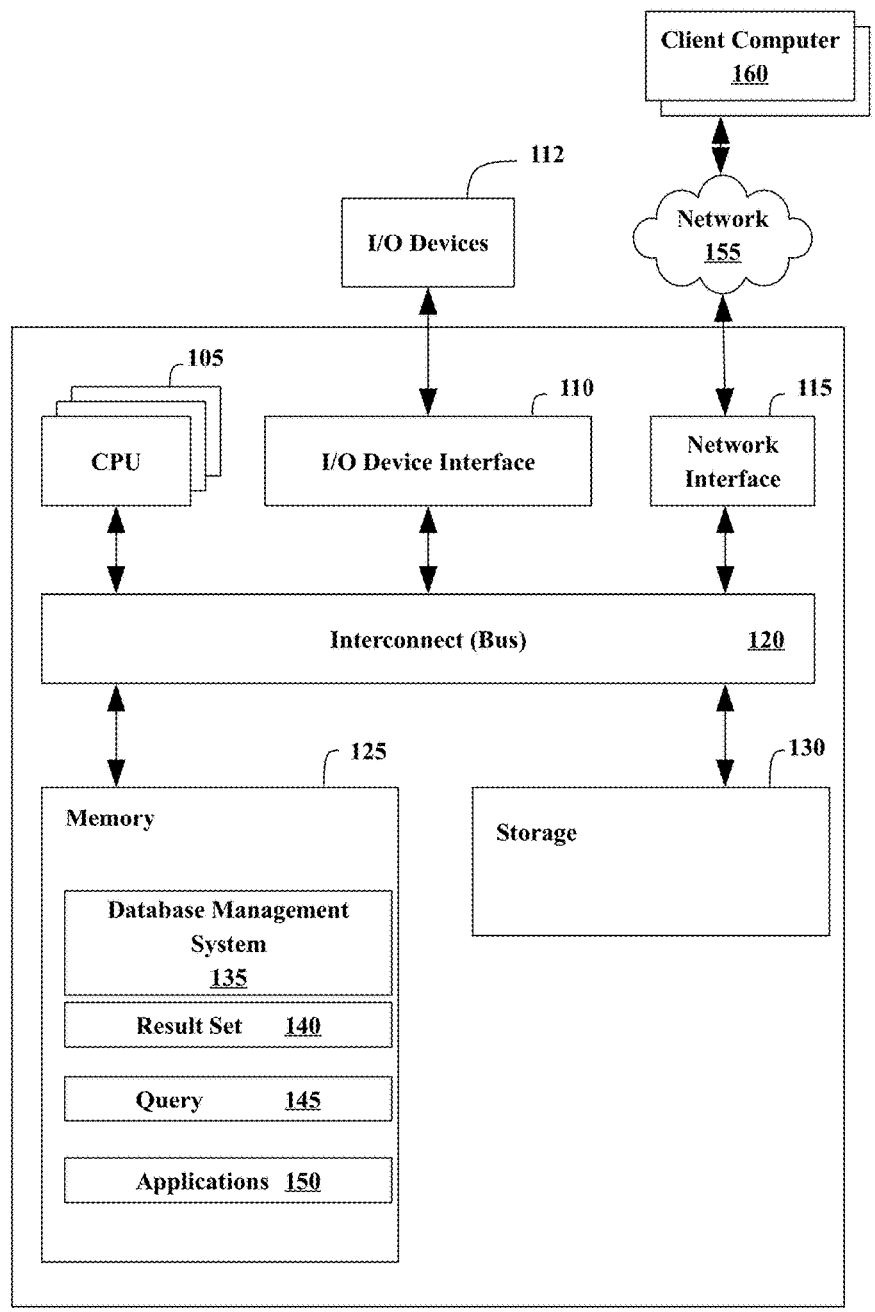
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to query hint learning in a database management system. Hints are supported by many databases including those which are key-value store, document-based, relational, hierarchical, object, etc. Database users/administrators can tailor queries in ways the user/administrator desires by inputting hints into their production environments (e.g., controlled by the user/administrator). Query hint learning, as described herein, may allow a database management system to use what a user/administrator input on an original query to influence operation of the database management system with respect to a later query (e.g., force an appropriate index). As such, query hint learning may provide the optimizer more information to make more efficient query plans for other/future queries based on information provided by the query hints (e.g., rather than having the optimized choose a less-appropriate index). Accordingly, the input of the administrator/user may be leveraged in other/future queries dynamically (e.g., algorithmically/automatically without another/added input/involvement from the user/administrator).

Aspects of the disclosure include a method, system, and computer program product for query hint learning in a database management system. A hint in a first query is detected by the database management system. The first query has a first signature. A second query is received by the database management system. The second query has a second signature. A determination is made by the database management system that the second signature correlates with the first signature. A query plan is established by the database management system. The query plan is based on the second query and uses the hint in the first query. In response to receiving the second query, the database management system processes the query plan. Using query hint learning, aspects of the disclosure may provide performance or efficiency benefits (e.g., speed, flexibility, responsiveness, resource usage, productivity). The optimizer of a database management system may benefit from learning from other queries. Administrators/users of the database management system can use their time on matters other than selecting hints (e.g., rather than sifting through large data stores of past queries). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
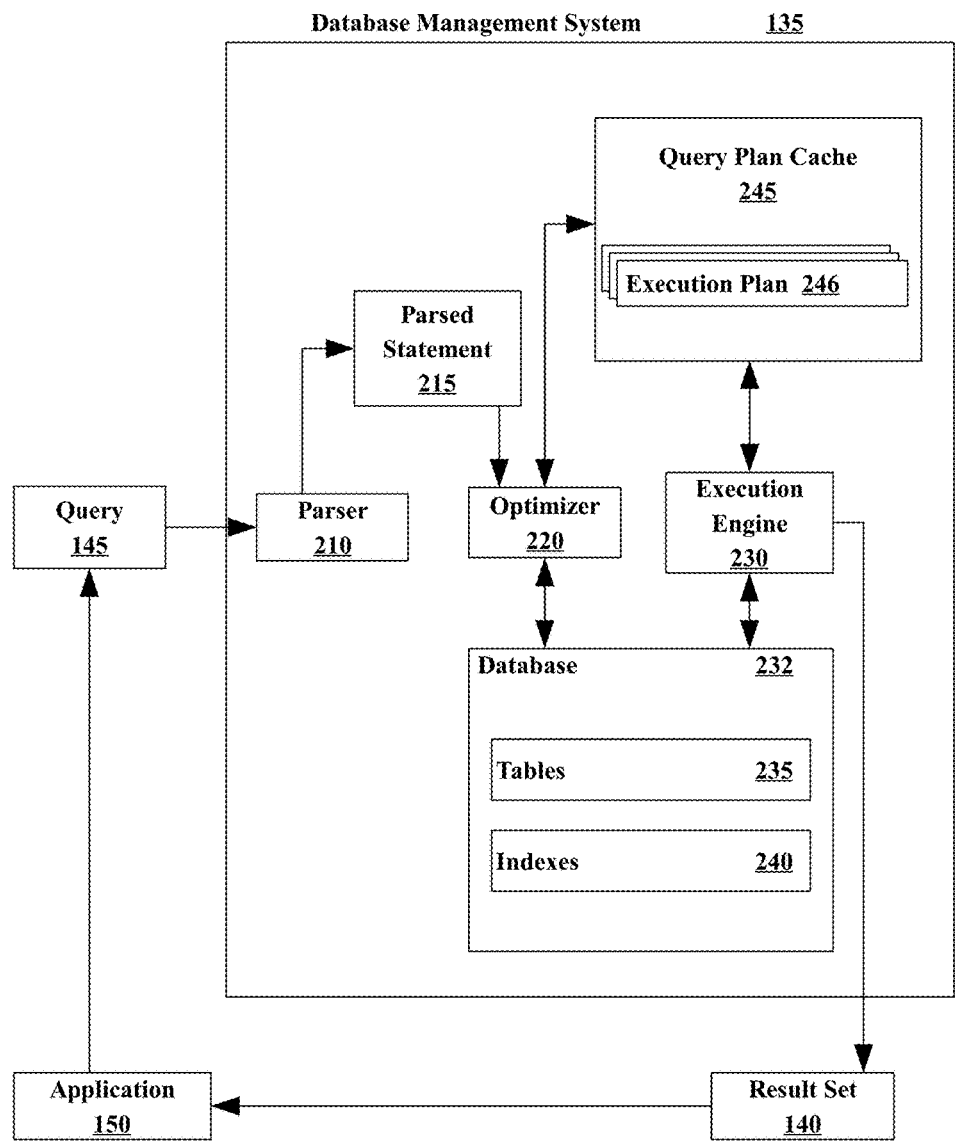
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
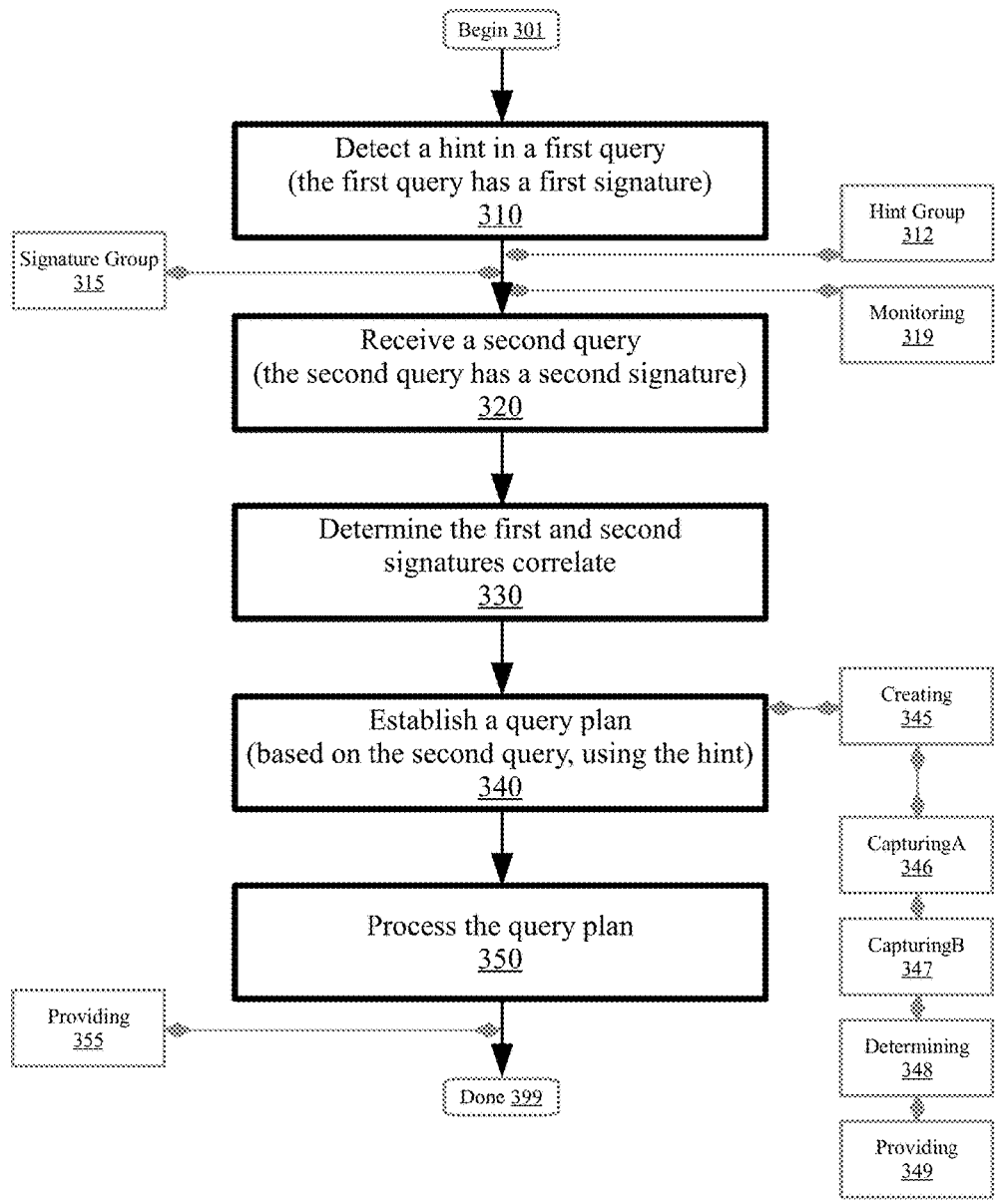
FIG. 3 is a flowchart illustrating a method for query hint learning according to embodiments.

FIG. 3 is a flowchart illustrating a method 300 for query hint learning according to embodiments. Hints are supported by many databases including those which are key-value store or document-based. Database users/administrators can tailor queries in ways the user/administrator desires by inputting hints into their production environments (e.g., controlled by the user/administrator). Query hint learning, as described herein, may allow a database management system to use what a user/administrator input on an original query to influence operation of the database management system with respect to a later query. As such, query hint learning may provide the optimizer more information to make more efficient query/access plans for other/future queries based on information provided by the query hints. Accordingly, the input of the administrator/user may be leveraged in other/future queries dynamically (e.g., algorithmically/automatically without another/added input/involvement from the user/administrator). Method 300 may begin at block 301.

At block 310, a hint in a first query is detected by the database management system. Detecting can include receiving (e.g., from a user, from an application), sensing (e.g., in a multidimensional array), collecting (e.g., in a data store), or obtaining (e.g., acquiring from another database). In embodiments, the hint includes a selection of one or more hints from a group at block 312. The group can include a table scan (e.g., no index), an index choice (e.g., which index), an index implementation (e.g., bitmap, probe, scan), a join order (e.g., of tables), a join implementation (e.g., nested loop, hash join, star join, merge join), a statistic (e.g., column statistics, frequent values list, histogram, cardinality, index statistics, table statistics, system statistics), a grouping implementation (e.g., index grouping, hash grouping, sort grouping), an ordering implementation (e.g., index sort, temporary table sort), a database code level (e.g., version, fix, fixpack level, database engine), an optimization goal (e.g., allio firstio), a fair memory share (e.g., a fair RAM share in megabytes per thread or per query), live data (e.g., insensitive, asensitive, sensitive), a processing intensive goal (e.g., processor versus input-output intensive goal), a parameter marker implementation, or a materialization goal (e.g., subquery, materialized query table, derived table).

The first query has a first signature. In embodiments, the signatures are based on at least one of a group at block 315. The group can include or be based on a parsed Structured Query Language (SQL) statement, an SQL tokenization, a token tree comparison, a table analysis, or a column bitmap. The signature may be useful when searching for a compatible query having a hint with respect to an incoming/submitted query yet to be fully processed. The signature may indicate relevancy, compatibility, or contextual similarity. In various embodiments, the signature may be used in a catalog/directory/library/list for efficient locating/anticipation of an appropriate query hint. Such a catalog may be developed using historical data, current information, or future projections to identify useful query-hint/query combinations.

In embodiments, an incoming query is monitored (e.g., monitored for) at block 319. The incoming query may be monitored by the database management system in response to detecting the hint in the first query. The incoming query (e.g., a second query) can be monitored to determine whether an incoming signature of the incoming query correlates with the first signature. At block 320, a second query is received (e.g., from a user) by the database management system. The second query has a second signature. At block 330, a determination is made by the database management system that the second signature correlates with (e.g., matches, substantially matches) the first signature. Correlation can include a threshold value/amount of identical features (e.g., sameness of 80% of elements of a set of clauses of the queries). Various query comparison algorithms may be utilized.

At block 340, a query plan is established by the database management system. Establishing can include creating, generating, structuring, constructing, forming, ascertaining, identifying, resolving, compiling, or computing. To illustrate, because structured query language (SQL) is declarative, there are typically multiple different ways to execute a given query (e.g., query plans) and each of those ways yields a different performance (e.g., while arriving at the same results). A query plan can include an ordered sequence of steps used to access or modify information in SQL based data systems. A typical query optimizer considers candidate query plans for a given query and determines which of those query plans will be efficient (e.g., lesser amount of latency).

The query plan is based on the second query and uses the hint in the first query. In embodiments, establishing the query plan can include using a machine-learning technique to learn from the first query at block 342. As such, the process may be automated without user intervention (e.g., machine-supplied hint from the database management system and not a human user/administrator). In embodiments, establishing the query plan includes creating a third query at block 345. The third query may be based on the second query and uses the hint in the first query. The third query may be one of a number of queries considered with respect to the query plan. To illustrate, consider the example usages of a hint which follow.

In the following example query, a hint (shown between "/*" and "*/") is utilized for the optimizer to use an index, "Employee_IX", for file employees. Accordingly, nest loop join processing is utilized with INDEX Employee_IX with respect to file employees.

Example Query 1 with a user/administrator provided hint:

```
SELECT /*+ USE_NL(a) INDEX (a Employee_IX) */ a.employee_id,
a.department_id,
b.salary
FROM employees a, hr_file b
WHERE a.employee_id = b.emp_id AND
    a.employee_id = b.manager_id AND
    a.hire_date => '01/01/2000'
```

If another query uses the same table, utilizing the hint may be beneficial. As such, the optimizer may add a transitive hint as follows.

Example Original Query 2A (as received/input/submitted, without having added in the hint):

```
SELECT a.employee_id, a.department_id, b.salary
FROM employees a, hr_file b
WHERE a.employee_id = b.emp_id AND
    a.employee_id = b.manager_id AND
    a.department_id > 100
```

The database management system may establish/apply the hint as follows to force the employee_IX index and nested loop (similar to the manner of Example Query 1). Example Modified Query 2A (as modified into a third query which is based on the second query and uses the hint in/from the first query):

```
SELECT /*+ Learning hint USE_NL(a) INDEX (a Employee_IX) */
a.employee_id,
a.department_id, b.salary
FROM employees a, hr_file b
WHERE a.employee_id = b.emp_id AND
    a.employee_id = b.manager_id AND
    a.department_id > 100
```

To illustrate further, consider a related example which uses the hint (e.g., replicating a portion of it).
Example Original Query 2B (as received/input/submitted, without having added in the hint):

```
SELECT a.employee_id, a.department_id
FROM employees a
WHERE a.employee_id = '1234567890' AND
      a.department_id > 100
```

A portion of the hint from Example Query 1 may be reused and applied to Example Original Query 2B (a single table query) as follows (e.g., forcing employee_IX index). The query optimizer computes that the hint does not apply for join, but that the index may have relevancy.
Example Modified Query 2B (as modified into a third query which is based on the second query and uses the hint in/from the first query):

```
SELECT /*+ Learning hint INDEX (a Employee_IX) */ a.employee_id,
a.department_id
FROM employees a
WHERE a.employee_id = '1234567890' AND
      a.department_id > 100
```

In various embodiments, a set of operations can be utilized to ascertain a benefit value (e.g., with respect to the query plan). A set of second query metadata may be captured by processing the second query at block 346. A set of third query metadata may be captured by processing the third query at block 347. By comparing the set of second query metadata with the set of third query metadata, it can be determined at block 348 that processing the third query has a benefit value with respect to processing the second query. Accordingly, the benefit value may be provided (e.g., transmitted to a compute node, sent via e-mail, recorded in a table, presented to a user, displayed by a monitor) at block 349.

For example, during a slower processing period for the database management system, both the third query (e.g., hinted query) and the second query (e.g., inbound query) may be run. Various outcomes may assist in determining a value of the transitive property of the hint. In particular, metadata such as a temporal value for running each query may be useful (e.g., run-time, query speed, time saved). In certain embodiments, the metadata may indicate or be classified with respect to statements or clauses. In various embodiments, the metadata may be numerical and values compared using arithmetic (and benefit shown numerically). In certain embodiments, the metadata may be evaluated by parsing the contents related to statements/clauses or indexes (and benefit shown based on the contents). In certain instances, the results of the queries may be substantively the same (e.g., same content/information) in a different form/organization (e.g., different order) which the metadata may indicate (and the user/administrator may indicate a preference).

At block 350, the database management system processes the query plan. The query plan is processed/executed/run in response to (e.g., subsequent to) receiving the second query. The query plan may be processed for storage (e.g., in a data store) or presentation (e.g., via a display). In embodiments, processing the query plan includes providing a valid results-set for the second query at block 355. Providing the valid results-set for the second query may include using the query plan. Providing the valid results-set for the second query can include routing the valid results-set to the originator of the second query, processing an output with respect to the valid results-set, returning the valid results-set to storage, or displaying at least a portion of a valid results-set (e.g., to a user).

Method 300 concludes at block 399. Aspects of method 300 may provide performance or efficiency benefits with respect to query hint learning. For example, aspects of method 300 may include positive impacts on resource usage (e.g., memory) or speed (e.g., processing) by (re)using hints from previous queries. Altogether, performance or efficiency benefits when processing a query using a learned hint may occur (e.g., flexibility, responsiveness, productivity).

Figure 4:
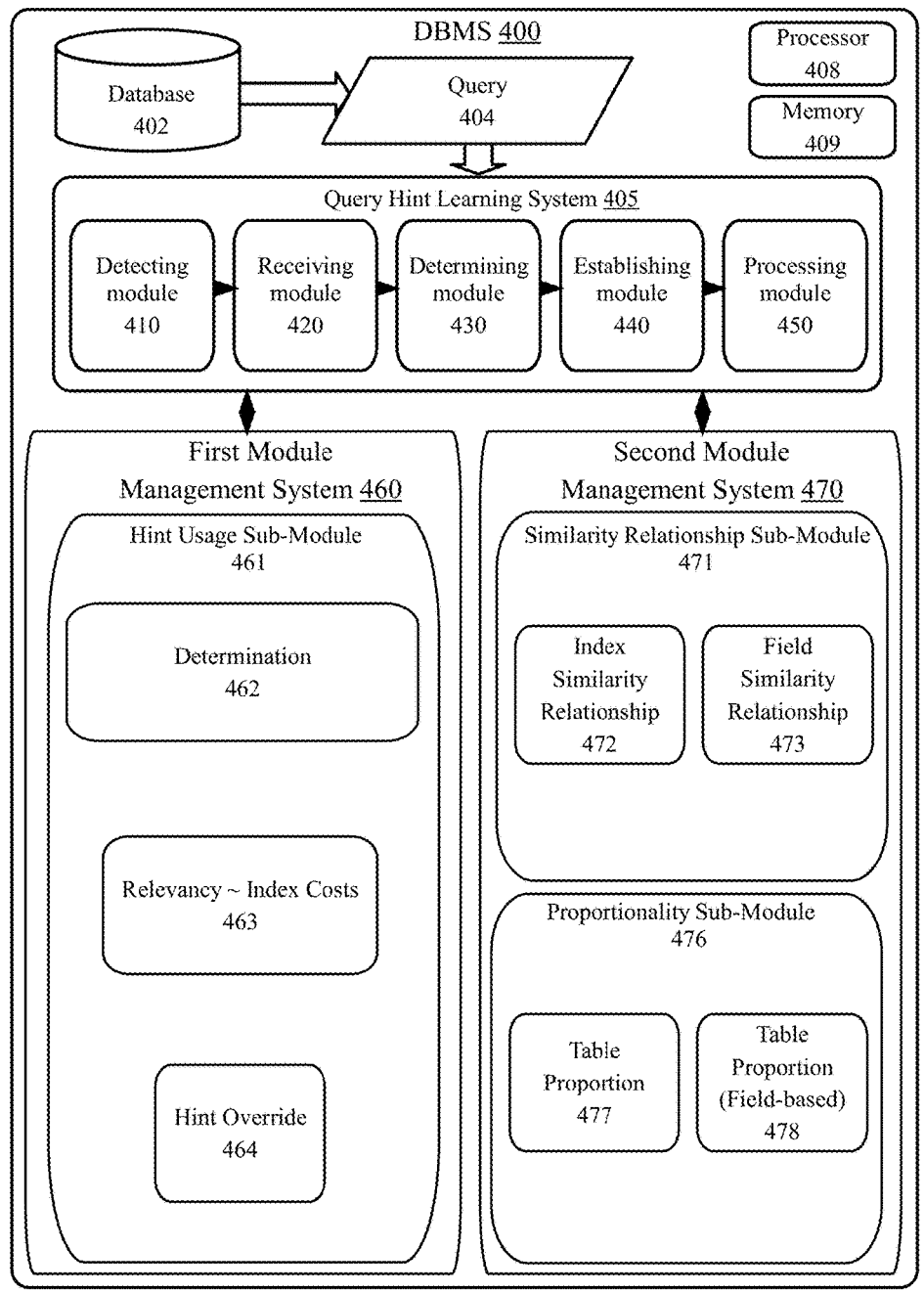
FIG. 4 shows an example system for query hint learning according to embodiments.

FIG. 4 shows an example system 400 for query hint learning according to embodiments. The example system 400 may illustrate a database management system (DBMS). The example system 400 includes a (computer/hardware) processor 408 and a memory 409. The example system 400 has a database 402 and has one or more queries 404. The one or more queries 404 may be used for operation(s) with respect to aspects described herein including methods 300 and the example system 400.

The example system 400 can include a query hint learning system 405. The query hint learning system 405 may include a detecting module 410 (see e.g., description with respect to block 310 of FIG. 3), a receiving module 420 (see e.g., description with respect to block 320 of FIG. 3), a determining module 430 (see e.g., description with respect to block 330 of FIG. 3), an establishing module 440 (see e.g., description with respect to block 340 of FIG. 3), and a processing module 450 (see e.g., description with respect to block 350 of FIG. 3). As such, the example system 400 may implement aspects of method 300. In embodiments, other aspects may be included.

In embodiments, the example system 400 includes a first module management system 460. The first module management system 460 may have a hint usage sub-module 461. The hint usage sub-module 461 may provide hints (e.g., perform actions as a hint adviser) or present suggestions as to when a hint may provide performance/efficiency benefits for another query. In some instances, the hint usage sub-module 461 can flag potential conflicts of hints when there are two different hints for two different queries which have similar properties.

The hint usage sub-module 461 can have a determination element 462. The determination element 462 may include a set of operations. A second hint can be detected in a fourth query; the fourth query may have a fourth signature. A determination may be made that the second signature (from the second query) correlates with the fourth signature. As such, a conflict for usage of the hint may exist. A user/administrator may be notified, or the database management system may perform an evaluation. By evaluating a set of hint data which indicates relevancy/pertinence/connection of both the hint in the first query and the second hint in the fourth query, it can be determined to use the hint in the first query. The set of hint data may include a usage profile for how the respective hints have been utilized historically. If the hint in the first query has a form, fit, and function that allows it to operate in a wide range of queries while the second hint in the fourth query has a narrow applicability to a small subset of queries, using the hint in the first query may be generally appropriate (unless one of the small subset of queries arises). How frequently particular hints have been used (e.g., relative to the age of the hint) may factor into which hint to use.

In various embodiments, relevancy may be related to a set of index costs with respect to element 463. If a query has two predicates and each one has its own index and the index costing between the two indexes are similar, a hinted index from another similar query may be used (e.g., the hinted index may receive a plus-factor with respect to gaining usage). Implementation can include using a cost ratio between indexes in each query plan. If producing an index using the hint in the first query costs twice as much as producing an index using the second hint in the fourth query, the fourth query may be evaluated to be a better option (when other aspects are equivalent).

In certain embodiments, a hint override element 464 may indicate to utilize the query with the learned hint when/even-if it costs more (e.g., run-time is longer but quality may be better). For instance, the more costly option may be chosen based on its relevancy to the second hint in the fourth query which the database management system ascertains that the user/administrator previously chose to use in another prior query plan. Accordingly, the set of index costs can include a second index cost for the second query and a query plan index cost for the query plan. As such, the query plan index cost exceeds the second index cost (yet the query plan is still processed/selected).

In embodiments, the example system 400 includes a second module management system 470. The second module management system 470 can be used as a precheck before using the hint. The second module management system 470 may have a similarity relationship sub-module 471 and a proportionality sub-module 476. The similarity relationship sub-module 471 can have an index similarity relationship element 472. Consider if the indexes covered the predicates differently between the first and second queries. In particular, consider if the first and second queries either both have or both do not have the index. If the (statistical) estimates are similar, then using the hint may be beneficial (e.g., if within a one standard-deviation threshold, if within a fifteen percent range). As such, the index similarity relationship element 472 may include a set of operations. A first index for the first query and a second index for the second query may be computed. Using the index computations, an index similarity relationship may be determined with respect to the first and second indexes (e.g., how statistically similar are the indexes).

The similarity relationship sub-module 471 can have a field similarity relationship element 473. The field similarity relationship element 473 may include a set of operations. A set of first index fields of a first index for the first query may be computed. A set of second index fields of a second index for the second query may be computed. A field similarity relationship can be determined between the set of second index fields and the set of first index fields (e.g., matching fields indicating similarity/identity for results-sets). For example, the first index may use fields A, B, D in the order ADB while the second index may use the same fields (A, B, D) in the order ABD. As such, for the purposes of processing the incoming query, the two indexes may both ultimately return identical results (perhaps in a slightly different order). In another example, the first index may use fields A, B, D in the order ADB while the second index may use the fields A, D, E in the order ADE. As such, for the purposes of processing the incoming query, the two indexes may ultimately return substantially similar results (e.g., particular if the fields B and E are interrelated or based-on one another). As such, field similarity may be used as a factor or weight with respect to aspects described herein.

The proportionality sub-module 476 can have a table proportion element 477. The table proportion element 477 may include a set of operations. A first proportion of a table of the database management system which is selected when processing the first query may be calculated. A second proportion of the table of the database management system which is selected when processing the second query may be calculated. It can be determined that the second proportion is within a mathematical threshold (e.g., statistical such as standard deviation, arithmetic such as difference) of the first proportion. For example, if a.hire_date=>'01/01/2000' of a first query selected 30% of table, and second query a.department_id>100 selected 39% of the table, then the hint may be utilized (e.g., within 35%). If instead only 2% of the table were selected, then usage of the hint may be passed-over.

The proportionality sub-module 476 can have a field-based table proportion element 478. The field-based table proportion element 478 may include a set of operations. A first proportion of a table of the database management system which is selected when processing the first query based on a first field may be calculated. A second proportion of the table of the database management system which is selected when processing the second query based on a second field (the second field differs from the first field) may be calculated. It can be determined that the second proportion is within a mathematical threshold of the first proportion. For example, a first query hints a first index over a first field/column (hire_date in query 1). A second query has a second field/column with a second index (over department_id in second query). The remainder of the first and second queries may be substantially similar (e.g., equivalent, matching, identical). If both the first and second fields/columns have similar statistical estimates (e.g., select about 33% of the rows), then it may provide performance/efficiency benefits to use the analogous index in the second query (which is over department_id). The same/identical rows may or may not be selected when running the indexes, but the ultimate performance/efficiency with respect to the query plan may benefit.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for query hint learning in a database management system, the method comprising:
    detecting, by the database management system, a hint in a first query, wherein the first query has a first signature, and wherein the hint includes statistics associated with a table in a database management system;
    receiving, by the database management system, a second query having a second signature, wherein the second query is received at a later time relative to the first query;
    determining, by the database management system, that the second signature correlates with the first signature;
    establishing, by the database management system, a query plan for executing the second query utilizing the hint in the first query, wherein establishing the query plan for executing the second query includes using a machine-learning technique to learn from the first query and the hint in the first query and creating a third query which is based on the second query and uses the hint in the first query; and
    processing, by the database management system in response to receiving the second query, the query plan for executing the second query.

2. The method of claim 1, wherein the first and second signatures are based on a group consisting of at least one of: a parsed Structured Query Language (SQL) statement, an SQL tokenization, a token tree comparison, a table analysis, or a column bitmap.

3. The method of claim 1, wherein processing the query plan includes:
    providing, using the query plan, a valid results-set for the second query.

4. The method of claim 1, further comprising:
    capturing, by processing the second query, a set of second query metadata;
    capturing, by processing the third query, a set of third query metadata;
    determining, by comparing the set of second query metadata with the set of third query metadata, that processing the third query has a benefit value with respect to processing the second query; and
    providing the benefit value.

5. The method of claim 1, wherein the second signature matches the first signature, and further comprising:
    monitoring, by the database management system in response to detecting the hint in the first query, an incoming query to determine whether an incoming signature of the incoming query matches the first signature, wherein the incoming query includes the second query.

6. The method of claim 1, further comprising:
    detecting, by the database management system, a second hint in a fourth query, wherein the fourth query has a fourth signature;
    determining, by the database management system, that the second signature correlates with the fourth signature; and
    determining, by evaluating a set of hint data which indicates relevancy of both the hint in the first query and the second hint in the fourth query, to use the hint in the first query.

7. The method of claim 6, wherein relevancy is related to a set of index costs.

8. The method of claim 7, wherein the set of index costs includes a second index cost for the second query and a query plan index cost for the query plan, and wherein the query plan index cost exceeds the second index cost.

9. The method of claim 1, further comprising:
    calculating a first proportion of the table of the database management system which is selected when processing the first query;
    calculating a second proportion of the table of the database management system which is selected when processing the second query; and
    determining the second proportion is within a mathematical threshold of the first proportion.

10. The method of claim 1, further comprising:
computing a first index for the first query;
computing a second index for the second query;
determining an index similarity relationship with respect to the second index and the first index; and
determining whether the hint in the first query is beneficial to apply to the second index of the second query based on the determined index similarity relationship.

11. The method of claim 1, further comprising:
computing a set of first index fields of a first index for the first query;
computing a set of second index fields of a second index for the second query; and
determining a field similarity relationship between the set of second index fields and the set of first index fields.

12. The method of claim 1, further comprising:
calculating a first proportion of a table of the database management system which is selected when processing the first query based on a first field;
calculating a second proportion of the table of the database management system which is selected when processing the second query based on a second field, wherein the second field differs from the first field; and
determining the second proportion is within a mathematical threshold of the first proportion.

13. The method of claim 1, wherein the hint includes a selection from a group consisting of at least one of: a table scan, an index choice, an index implementation, a join order, a join implementation, a grouping implementation, an ordering implementation, a database code level, a fair memory share, live data, a processing intensive goal, a parameter marker implementation, or a materialization goal.

14. The method of claim 1, further comprising:
detecting, by the database management system, a second hint in a fourth query, wherein the fourth query has a fourth signature;
determining, by the database management system, that the second signature correlates with the fourth signature;
determining, by evaluating a set of hint data which indicates relevancy of both the hint in the first query and the second hint in the fourth query, to use the hint in the first query;
calculating a first proportion of a table of the database management system which is selected when processing the first query;
calculating a second proportion of the table of the database management system which is selected when processing the second query;
determining the second proportion is within a mathematical threshold of the first proportion;
computing a first index for the first query;
computing a second index for the second query; and
determining an index similarity relationship with respect to the second index and the first index.

15. The method of claim 14, wherein:
the first and second signatures are based on a first group consisting of at least one of: a parsed Structured Query Language (SQL) statement, an SQL tokenization, a token tree comparison, a table analysis, or a column bitmap;
the hint includes a selection from a second group consisting of at least one of: a table scan, an index choice, an index implementation, a join order, a join implementation, a statistic, a grouping implementation, an ordering implementation, a database code level, an optimization goal, a fair memory share, live data, a processing intensive goal, a parameter marker implementation, or a materialization goal;
relevancy is related to a set of index costs;
the set of index costs includes a second index cost for the second query and a query plan index cost for the query plan; and
the query plan index cost exceeds the second index cost.

* * * * *